United States Patent
Deluca et al.

(10) Patent No.: US 10,176,499 B2
(45) Date of Patent: Jan. 8, 2019

(54) ADVERTISEMENT SELECTION BY USE OF PHYSICAL LOCATION BEHAVIOR

(71) Applicant: INTERNATIONAL BUSINESS MACHINES CORPORATION, Armonk, NY (US)

(72) Inventors: Lisa Seacat Deluca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/595,385

(22) Filed: May 15, 2017

(65) Prior Publication Data
US 2018/0330406 A1    Nov. 15, 2018

(51) Int. Cl.
G06Q 30/02        (2012.01)
H04N 21/258       (2011.01)

(52) U.S. Cl.
CPC ..... *G06Q 30/0276* (2013.01); *G06Q 30/0252* (2013.01); *G06Q 30/0261* (2013.01); *G06Q 30/0269* (2013.01); *G06Q 30/0277* (2013.01); *H04N 21/25841* (2013.01); *G06Q 30/02* (2013.01)

(58) Field of Classification Search
CPC ................................................ H04N 21/25841
See application file for complete search history.

(56) References Cited

U.S. PATENT DOCUMENTS

| | | | | |
|---|---|---|---|---|
| 7,296,088 | B1* | 11/2007 | Padmanabhan | H04L 45/04 709/238 |
| 8,332,454 | B1* | 12/2012 | Cona | G01C 21/3415 340/8.1 |
| 2008/0004884 | A1 | 1/2008 | Flake et al. | |
| 2012/0078706 | A1* | 3/2012 | Rajagopalan | G06Q 30/00 705/14.41 |
| 2012/0271715 | A1* | 10/2012 | Morton | G06Q 30/0257 705/14.53 |
| 2013/0204709 | A1* | 8/2013 | Katayev | G06Q 30/02 705/14.66 |
| 2014/0222562 | A1 | 8/2014 | Akgul et al. | |
| 2015/0025936 | A1 | 1/2015 | Garel et al. | |

FOREIGN PATENT DOCUMENTS

| | | | |
|---|---|---|---|
| WO | 2014089462 A2 | 6/2014 | |
| WO | 2014207740 A1 | 12/2014 | |

OTHER PUBLICATIONS

"Amazon Advertising Preferences" [accessed from the Internet on Apr. 6, 2017]. Retrieved from Internet URL: <http://www.amazon.com/gp/dra/info>, 1 pg.

(Continued)

*Primary Examiner* — Joshua D Taylor
(74) *Attorney, Agent, or Firm* — Heslin Rothenberg Farley & Mesiti P.C.

(57) ABSTRACT

Methods, computer program products, and systems are presented. The methods include, for instance: generating a set of one or more candidate advertisement to be displayed on a device of a user. Each candidate advertisement may be respectively associated with a relevant zone in physical venues.

19 Claims, 6 Drawing Sheets

(56) References Cited

OTHER PUBLICATIONS

Finnie, Rick, "Time is money! The impact of customer "Dwell Time" on Retail Sales" [retrieved from the Internet on Apr. 6, 2017]. Retrieved from Internet URL: https://www.linkedin.com/pulse/20140807162720-258558574-time-is-money-the-impact-of-customer-dwell-time-on-retail-sales>, published Aug 7, 2014, 3 pgs.

Mell, Peter, et al., "The NIST Definition of Cloud Computing", NIST Special Publication 800-145, Sep. 2011, Gaithersburg, MD, 7 pgs.

* cited by examiner

ADVERTISEMENT SELECTION BY USE OF PHYSICAL LOCATION BEHAVIOR

TECHNICAL FIELD

The present disclosure relates to hybrid marketing technology, and more particularly to methods, computer program products, and systems for selecting web and/or mobile advertisements based on user location activities in physical venues.

BACKGROUND

In conventional web and mobile advertisements, depending on sites, some personalization of the advertisement is attempted by use of various on-line behaviors such as site visits, item views, searches, transactions, etc., in order to present advertisements more preferable for individual users. In certain conventional advertisement systems, an advertisement is randomly selected from available advertisements for every visitor to a site/user of a mobile app.

SUMMARY

The shortcomings of the prior art are overcome, and additional advantages are provided, through the provision, in one aspect, of a method. The method for customizing an advertisement display for a user includes, for example: generating, by one or more processor, a set of one or more candidate advertisement, wherein the one or more candidate advertisement is respectively associated with at least one relevant zone in one or more physical; and obtaining, by the one or more processor, a request to select an advertisement from the set in order to be displayed on a device of the user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
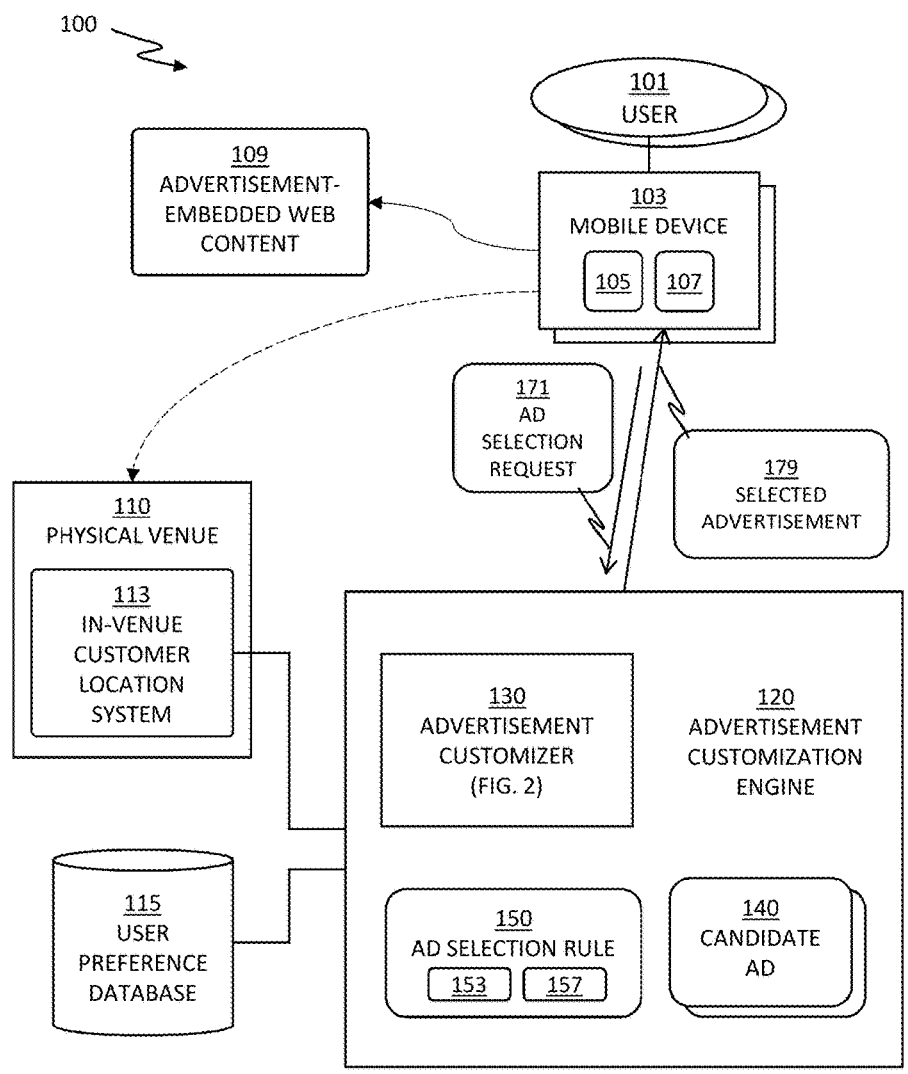
FIG. 1 depicts a system for selecting advertisements by use of activity data from a physical venue, in accordance with one or more embodiments set forth herein.

FIG. 1 depicts a system 100 for selecting advertisements by use of activity data from a physical venue 110, in accordance with one or more embodiments set forth herein.

The system 100 includes an advertisement customization engine 120 that provides advertisement selection services based on various user preference data including physical location activities. When a user 101 from one or more user accesses a mobile application 105 having embedded advertisement displays and/or an advertisement-embedded web content 109 via a web browser 107 from a mobile device 103, the mobile device 103 sends an ad selection request 171 to the advertisement customization engine 120.

The physical venue 110 is equipped with an in-venue customer location system 113 that utilizes various micro location technologies such as geo-fencing, Bluetooth Low Energy (BLE) beaconing, etc. The in-venue customer location system 113 may timestamps and records various micro location events generated by the user 101 in the physical venue 110, which may be compiled into zone activities such as entries into and exits out of respective zones by the user 101 in the physical retail location 110, as well as dwell times of the user 101 at certain zones.

The advertisement customization engine 120 includes an advertisement customizer 130, candidate advertisements 140, and an advertisement selection rule 150. The advertisement customizer 130 prepares the candidate advertisements 140 by associating respective candidate advertisements 140 with relevant zones of the physical venue 110 where applicable. Where the advertisement customizer 130 discovers activities by the user 101 from the zones that has been associated with the respective candidate advertisements 140, the advertisement customizer 130 may select a specific candidate advertisement corresponding to the zones. The advertisement customizer 130 may be configured to apply timeframe of the zone activities, such as past week, past three months, overall history, etc., to promote different types of products and to analyze a pattern of dwell behaviors shown during a decision procedure of one or more purchases.

The advertisement selection rule 150 has a zone-based category 153 and a default category 157. The zone-based category 153 of the advertisement selection rule 150 determines which advertisement should be displayed to the user 101 wherein the user 101 visited the physical venue 110 and zone activities by the user 101 has been associated with any candidate advertisements 140. The default category 157 of the of the advertisement selection rule 150 determines which advertisement should be displayed to the user 101 without using location data at the physical venue 110, including zone activities, wherein the user 101 either had not visited the physical venue 110 or zone activities by the user 101 has not been associated with any candidate advertisements 140. As a result, the advertisement customization engine 120 sends a selected advertisement 179 and/or an identification of the selected advertisement to the mobile device 103 for display to the user 101.

The advertisement customization engine 120 may utilize a user preference database 115 in compiling the advertisement selection rule 150. The user preference database 115 may include various online preference data such as purchase histories of users on subject websites, search histories and/or viewed products by the users, visits to subject websites and/or accesses to subject contents, use of commerce services like e-payment on the subject websites, etc. Conventional advertisement personalization services presently utilizes data from the user preference database 115. Similarly, the default category 157 of the of the advertisement selection rule 150, which is applied where the zone activities at the physical venue 110 is not available for selecting one from the candidate advertisements 140, may utilize the data from the user preference database 115 to customize an advertisement for the user 101.

Figure 2:
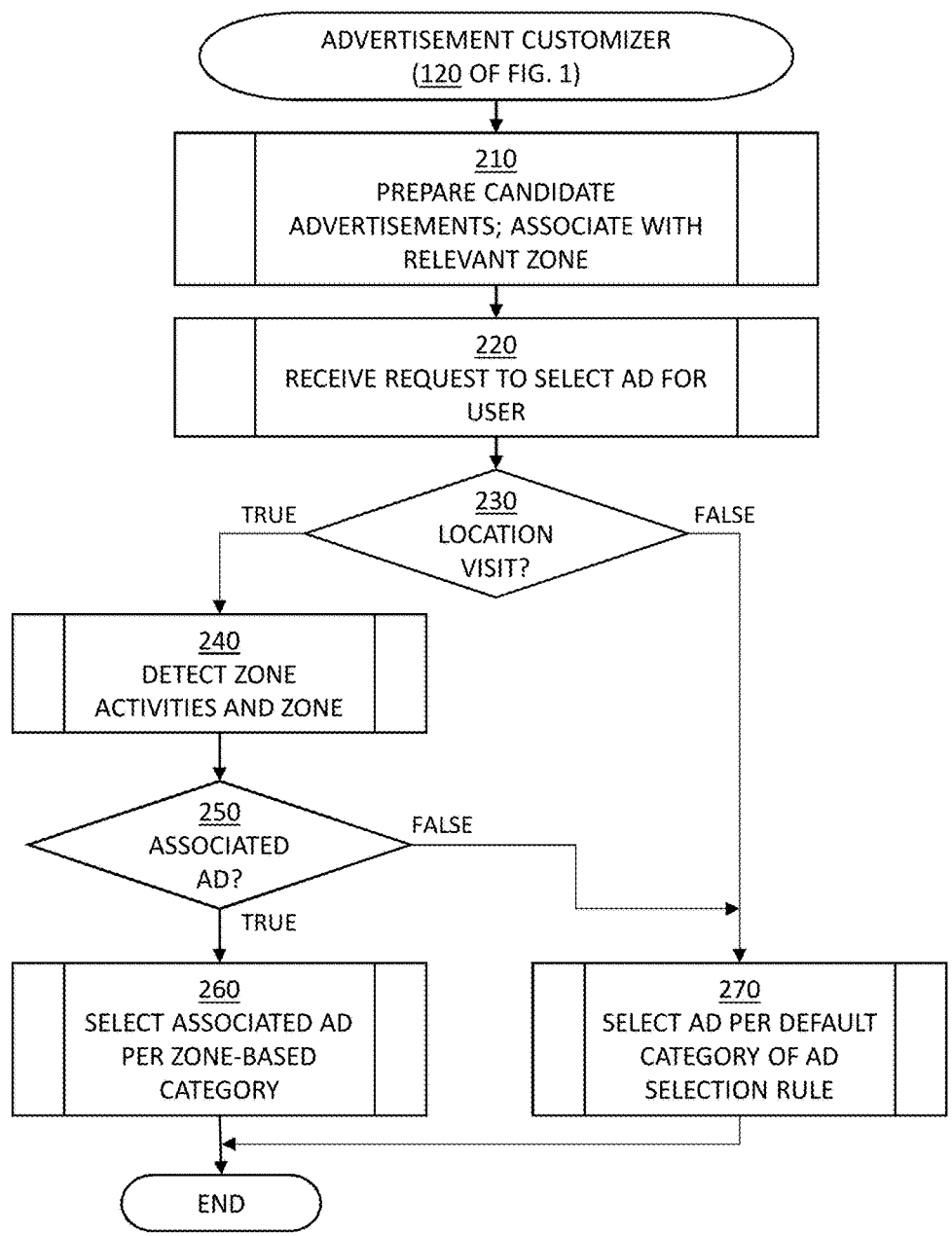
FIG. 2 depicts a flowchart performed by the advertisement customizer, in accordance with one or more embodiments set forth herein.

FIG. 2 depicts a flowchart performed by the advertisement customizer 130 of FIG. 1, in accordance with one or more embodiments set forth herein.

In block 210, the advertisement customizer 130 prepares a set of candidate advertisements by creating and/or obtaining the candidate advertisements and by marking each advertisement for relevant products and relevant zone within retail stores. Certain products would be physically displayed together in a certain aisle, section, counter, and/or corner, and the term "zone" collectively refers to such localized physical departments within retail stores, represented as boundaries for micro locations. The advertisement customizer 130 may extract the relevant products and zone from description, image, text, tag line, company name, etc., of each candidate advertisement and then automatically mark the extracted products/zone to respective candidate advertisements. For example, the advertisement customizer 130 may associate a candidate advertisement for a new pair of running shoes with sports gear and shoes zones. Then the advertisement customizer 130 proceeds with block 220.

In block 220, the advertisement customizer 130 receives a request to select an advertisement for a user 101 as the user 101 accesses a website and/or launches a mobile application that is configured to display one of the candidate advertisements. Then the advertisement customizer 130 proceeds with block 230.

In block 230, the advertisement customizer 130 examine location history of the user 101 to determine if the user 101 has visited a physical retail store associated with the candidate advertisements or similar other retail stores. If the advertisement customizer 130 determines that the user 101 has visited physical retail stores that are tagged for the candidate advertisements, then advertisement customizer 130 proceeds with block 240. If the advertisement customizer 130 determines that the user 101 has not visited any physical retails stores tagged for the candidate advertisements, then advertisement customizer 130 proceeds with block 270.

In block 240, the advertisement customizer 130 collects micro location data in the physical retail stores and analyzes the collected micro location data in order to determine how the user 101 behaved in the physical retail stores, such as names of zones that had been visited, dwell times in respective zones indicating lengths of time that had been spent in the respective zones, latest zone activities, etc. The micro location data include numerous dates/time stamps for zone entries and/or zone exits, available from in-store location systems, micro location beacons, and/or from mobile smart device of the user 101 that has location tracking functionalities, etc. Then the advertisement customizer 130 proceeds with block 250.

In block 250, the advertisement customizer 130 examine zone activities, particularly a dwell behavior, as discovered from block 240 and determines if any candidate advertisements are associated with respective zones wherein the dwell behavior had been discovered. The advertisement customizer 130 interprets the dwell behavior as a level of interest on the products in the zone, and accordingly, the advertisement associated with a zone in which the user 101 recorded a long dwell time would be most effective for marketing purposes. If the advertisement customizer 130 discovers one or more candidate advertisements that are associated with respective zones wherein the zone activities had been detected, then the advertisement customizer 130 proceeds with block 260. If the advertisement customizer 130 does not discover any candidate advertisements associated with the zones wherein the zone activities had been detected, then the advertisement customizer 130 proceeds with block 270.

In block 260, the advertisement customizer 130 selects one of the candidate advertisement that is associated with the zones with detected zone activities for display, according to a preconfigured advertisement selection category. The advertisement customizer 130 forwards the selected candidate advertisement and/or an identification of the selected candidate advertisement to the mobile device 103 such that the mobile device 103 may display the selected candidate advertisement in a screen area allotted for the advertisement within the website and/or the mobile application accordingly. In certain embodiment of the present invention, the preconfigured advertisement selection category may dictate the advertisement customizer 130 to display, amongst the candidate advertisements, an advertisement that is associated with the most recent zone activity. In certain embodiment of the present invention, the preconfigured advertisement selection category may dictate the advertisement customizer 130 to display another advertisement that is associated with a zone that records the longest dwell time for the user 101. Then the advertisement customizer 130 terminates processing, or hibernates until a next advertisement selection request is received at block 220.

In block 270, the advertisement customizer 130 selects and displays, via the mobile device 103, one of the candidate advertisements according to a default advertisement selection category wherein associate zone/zone activity has not been discovered such as random selection, web search history based selection, etc. Then the advertisement customizer 130 terminates processing, or hibernates until a next advertisement selection request is received at block 220.

Figure 3:
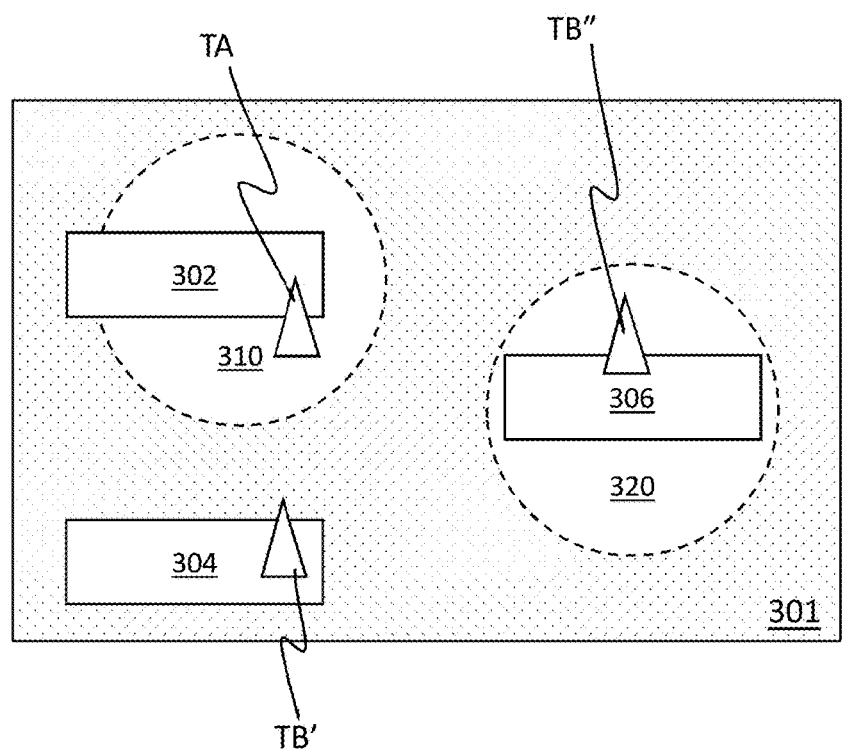
FIG. 3 depicts exemplary zones in the physical venue and corresponding zone-based categories in the advertisement selection rule, in accordance with one or more embodiments set forth herein.

FIG. 3 depicts exemplary zones in the physical venue 110 and corresponding zone-based categories in the advertisement selection rule 150, in accordance with one or more embodiments set forth herein.

A floorplan 301 corresponding to the physical venue 110 has a Women's Shoes section 302, an Electronics section 304, and a Books section 306, among other sections. The in-venue customer location system 113 has recorded a first zone activity TA that Mary visited and spent two hours in the Women's Shoes section 302 of the physical venue 110 in the past week. The in-venue customer location system 113 has also recorded a second zone activity TB' that Bob spent half an hour in the Electronics section 304 during his visit to the physical venue 110, and a third zone activity TB" that Bob spent one and a half hours in the Books section 306 in the past week.

The advertisement customizer 130 has tagged some of candidate advertisements 140 during preparation. As a result, a first advertisement is associated with a Women's Shoes zone 310, a second advertisement is associated with an Electronics zone 320. The advertisement customizer 130 selects the first advertisement associated with the Women's Shoes zone 310 when Mary accesses the advertisement-embedded web content 109 based on the zone activity of Mary TA. Similarly, when Bob accesses the advertisement-embedded web content 109, the advertisement customizer 130 detects the second and third zone activities TB' and TB", and examines if the zone activities TB' and TB" have any associated candidate advertisement. Because there is no candidate advertisement associated with the second zone activity TB' at the Books section 304, the advertisement customizer 130 selects the second advertisement associated with the Electronics zone 320 based on the third zone activity TB". In cases wherein both zone activities TB' and TB" have respectively associated candidate advertisements, then the advertisement customizer 130 may select a candidate advertisement associated with a longer dwell time, a more recent zone activity, a higher number of zone entry activities, etc., according to additional selection categories of the advertisement selection rule 150.

Certain embodiments of the present invention may offer various technical computing advantages, including automated selection of advertisements based on physical location behaviors of a user. Certain embodiments of the present invention provides technology to personalize advertisement according to interests/preferences of the user as demonstrated by physical location behaviors, particularly dwell times as logged by the in-venue customer location system and/or in the mobile devices of the users. Certain embodiments of the present invention extends utilities of the location data available from existing location marketing systems by providing a mechanism to utilize the physical location behavior data in order to customize cyberspace advertisements for the users. Because the physical behavior is demonstrated in association with a certain product type, many other areas of marketing efforts such as email campaigns, event notifications, etc., may be better customized to user preferences. Also by use of multithreading and/or multiprocessing, the hybrid advertisement selection services may be concurrently rendered for any number of users and/or advertisers. Certain embodiments of the present invention may be implemented by use of a cloud platform/data center, and the hybrid advertisement selection services may be provided as a subscribed service for advertiser clients. Certain embodiments of the present invention improves the effectiveness of certain advertisements by customizing the advertisements of products in which the users had shown physical location behavior demonstrating the interest on the products, and more likely to lead to a purchase of the products than other advertisement selection mechanisms.

Figure 4:
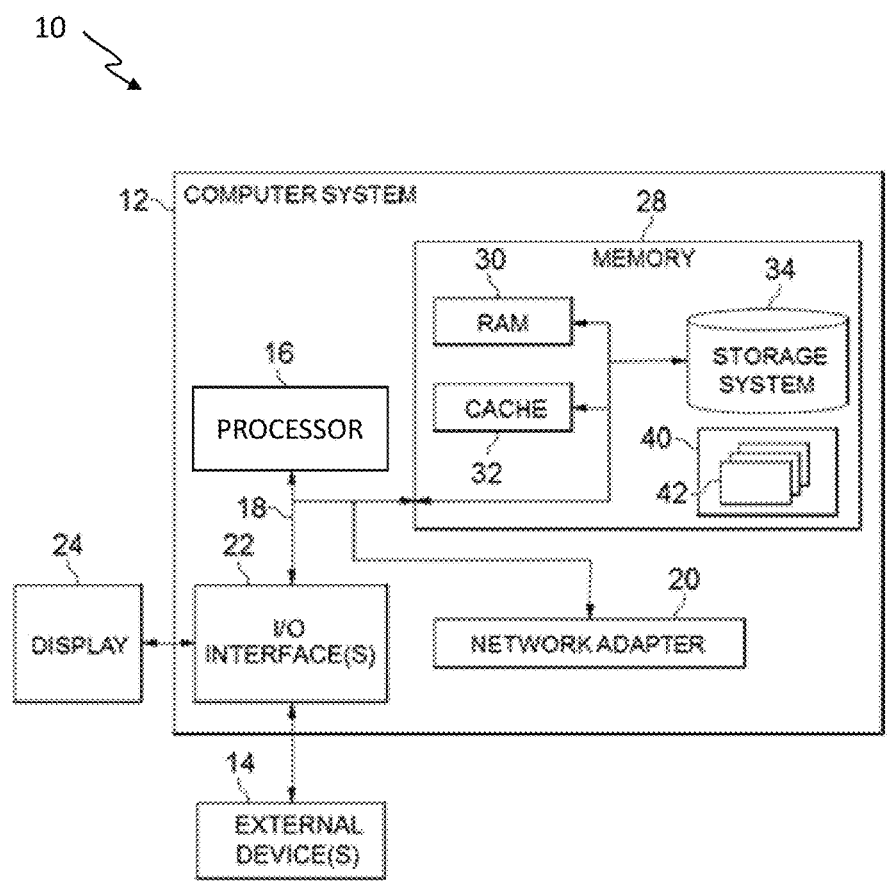
FIG. 4 depicts a cloud computing node according to an embodiment of the present invention.
Figure 5:
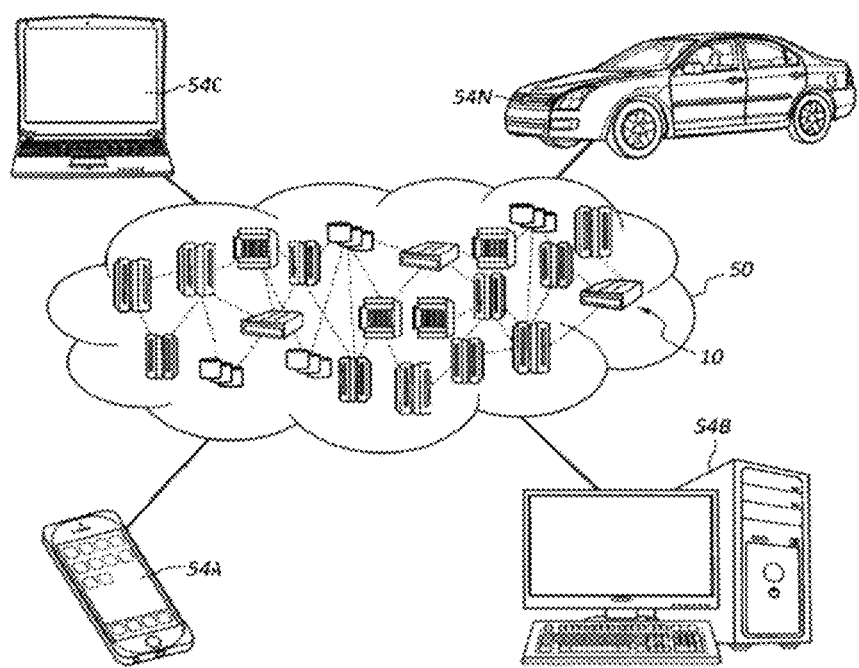
FIG. 5 depicts a cloud computing environment according to an embodiment of the present invention.
Figure 6:
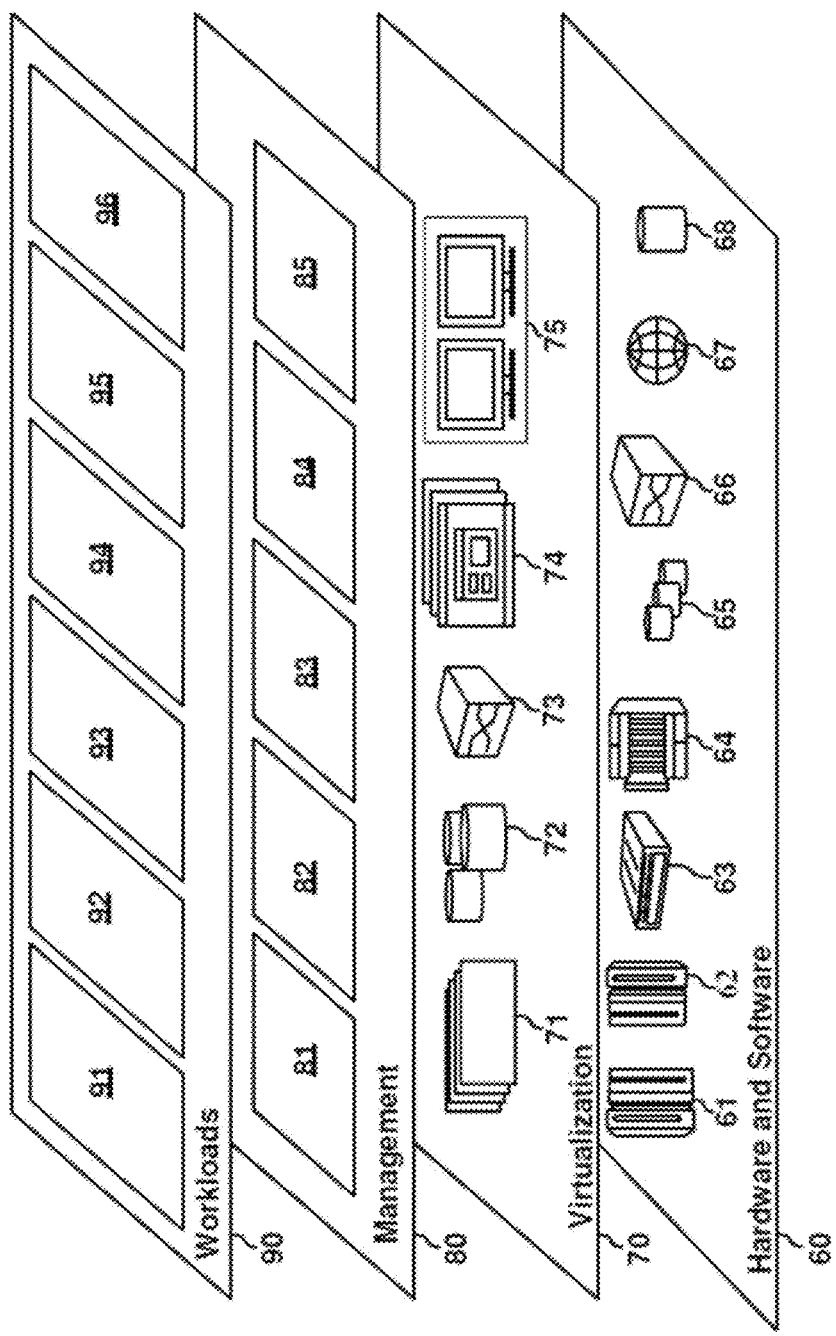
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the advertisement customizer 130 of FIG. 1. Program processes 42, as in the advertisement customizer 130 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the advertisement customization engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a mmory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the using an Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for customizing an advertisement display for a user, comprising: generating, by one or more processor, a set of one or more candidate advertisement, wherein the one or more candidate advertisement is respectively associated with at least one relevant zone in one or more physical; and obtaining, by the one or more processor, a request to select an advertisement from the set in order to be displayed on a device of the user; detecting one or more activity of the user and one or more zone respectively corresponding to the one or more activity, wherein the one or more zone is located in a physical venue from the one or more physical venue, responsive to determining that the user has visited the physical venue; ascertaining that the user visited a first zone and a second zone from the one or more zone in the physical venue, wherein the first zone is distinctive from the second zone, wherein first location data corresponding to a first activity of the user includes an entry timestamp to the first zone, an exit timestamp from the first zone, and wherein second location data corresponding to a second activity of the user includes an entry timestamp to the second zone, an exit timestamp from the second zone; and determining that the first zone is associated with a first candidate advertisement from the set and that the second zone is associated with a second candidate advertisement from the set; selecting the first advertisement for the user responsive to discovering that the user performed a higher number of zone entry activities with respect to the first zone than the second zone; and sending the first candidate advertisement for display to the device of the user.

2. The computer implemented method of claim 1, further comprising:
   detecting one or more activity of the user and one or more zone respectively corresponding to the one or more activity, wherein the one or more zone is located in a physical venue or the one or more physical venue, responsive to determining that the user has visited the physical venue;
   selecting a matching candidate advertisement from the set for the user, responsive to determining that the one or more zone from the detecting is associated with the matching candidate advertisement from the set as a relevant zone corresponding to the matching candidate advertisement; and
   sending the matching candidate advertisement for display to the device of the user.

3. The computer implemented method of claim 1, further comprising: selecting the first advertisement for the user, responsive to discovering that the user spent time in the first zone more recently than in the second zone by use of the first location data and the second location data; and sending the first candidate advertisement for display to the device of the user.

4. The computer implemented method of claim 1, further comprising:
   detecting an activity of the user and a zone corresponding to the activity, wherein the zone is located in a physical venue from the one or more physical venue, responsive to determining that the user has visited the physical venue;
   selecting a candidate advertisement from the set for the user according to a default category of an advertisement selection rule, wherein the default category selects the candidate advertisement without using location data generated from the physical venue, responsive to determining that the zone in which the activity has been detected is not associated with any candidate advertisement from the set; and
   sending the candidate advertisement for display to the device of the user.

5. The computer implemented method of claim 1, further comprising:
   selecting a candidate advertisement from the set for the user according to a default category of an advertisement selection rule, wherein the default category selects the candidate advertisement without using location data generated from the one or more physical venue, responsive to determining that the user has not visited any of the one or more physical venue; and
   sending the candidate advertisement for display to the device of the user.

6. The method of claim 1, wherein the obtaining a request to select an advertisement from the set in order to be displayed on a device of the user includes obtaining a request to select an advertisement from the set in order to be displayed on a mobile device of the user, wherein the method further includes sending the advertisement for display on a display of the mobile device of the user with the user being external to the one or more physical venue, wherein the obtaining a request is in response to an action of the user, the action being that the user access a mobile application having embedded advertisements.

7. The system of claim 1, wherein the obtaining a request is in response to an action of the user, and wherein the request is sent from the mobile device of the user.

8. The system of claim 1, wherein the obtaining a request is in response to an action of the user, the action being that the user access web content via a web browser.

9. The system of claim 1, wherein the obtaining a request is in response to an action of the user, the action being that the user access a mobile application having embedded advertisements.

10. A computer program product comprising: a non-transitory computer readable storage medium readable by one or more processor and storing instructions for execution by the one or more processor for performing a method for customizing an advertisement display for a user, comprising: generating, by one or more processor, a set of one or more candidate advertisement, wherein the one or more candidate advertisement is respectively associated with at least one relevant zone in one or more physical; and obtaining, by the one or more processor, a request to select an advertisement from the set in order to be displayed on a device of the user; detecting one or more activity of the user and one or more zone respectively corresponding to the one or more activity, wherein the one or more zone is located in a physical venue from the one or more physical venue, responsive to determining that the user has visited the physical venue; ascertaining that the user visited a first zone and a second zone from the one or more zone in the physical venue, wherein the first zone is distinctive from the second zone, wherein first location data corresponding to a first activity of the user includes an entry timestamp to the first zone, an exit timestamp from the first zone, and wherein second location data corresponding to a second activity of the user includes an entry timestamp to the second zone, an exit timestamp from the second zone; and determining that the first zone is associated with a first candidate advertisement from the set and that the second zone is associated with a second candidate advertisement from the set; selecting the first advertisement for the user responsive to discovering that the user performed a higher number of zone entry activities with respect to the first zone than the second zone; and sending the first candidate advertisement for display to the device of the user.

11. The computer program product of claim 10, further comprising: detecting one or more activity of the user and one or more zone respectively corresponding to the one or more activity, wherein the one or more zone is located in a physical venue or the one or more physical venue, responsive to determining that the user has visited the physical venue; selecting a matching candidate advertisement from the set for the user, responsive to determining that the one or more zone from the detecting is associated with the matching candidate advertisement from the set as a relevant zone corresponding to the matching candidate advertisement; and sending the matching candidate advertisement for display to the device of the user.

12. The computer program product of claim 10, further comprising: detecting one or more activity of the user and one or more zone respectively corresponding to the one or more activity, wherein the one or more zone is located in a physical venue from the one or more physical venue, responsive to determining that the user has visited the physical venue; ascertaining that the user visited a first zone and a second zone from the one or more zone in the physical venue, wherein the first zone is distinctive from the second zone, wherein first location data corresponding to a first activity of the user includes an entry timestamp to the first zone, an exit timestamp from the first zone, and wherein second location data corresponding to a second activity of the user includes an entry timestamp to the second zone, an exit timestamp from the second zone; and determining that the first zone is associated with a first candidate advertisement from the set and that the second zone is associated with a second candidate advertisement from the set.

13. The computer program product of claim 10, further comprising: selecting the first advertisement for the user, responsive to discovering that the user spent more time in the first zone than in the second zone by use of the first location data and the second location data; and sending the first candidate advertisement for display to the device of the user.

14. The computer program product of claim 10, further comprising: selecting the first advertisement for the user, responsive to discovering that the user spent time in the first zone more recently than in the second zone by use of the first location data and the second location data; and sending the first candidate advertisement for display to the device of the user.

15. The computer program product of claim 10, further comprising: detecting an activity of the user and a zone corresponding to the activity, wherein the zone is located in a physical venue from the one or more physical venue, responsive to determining that the user has visited the physical venue; selecting a candidate advertisement from the set for the user according to a default category of an advertisement selection rule, wherein the default category selects the candidate advertisement without using location data generated from the physical venue, responsive to determining that the zone in which the activity has been detected is not associated with any candidate advertisement from the set; and sending the candidate advertisement for display to the device of the user.

16. A system comprising: a memory; one or more processors in communication with the memory; and program instructions executable by the one or more processor via the memory to perform a method for customizing an advertisement display for a user, comprising: generating, by one or more processor, a set of one or more candidate advertisement, wherein the one or more candidate advertisement is respectively associated with at least one relevant zone in one or more physical; and obtaining, by the one or more processor, a request to select an advertisement from the set in order to be displayed on a device of the user; detecting one or more activity of the user and one or more zone respectively corresponding to the one or more activity, wherein the one or more zone is located in a physical venue from the one or more physical venue, responsive to determining that the user has visited the physical venue; ascertaining that the user visited a first zone and a second zone from the one or more zone in the physical venue, wherein the first zone is distinctive from the second zone, wherein first location data corresponding to a first activity of the user includes an entry timestamp to the first zone, an exit timestamp from the first zone, and wherein second location data corresponding to a second activity of the user includes an entry timestamp to the second zone, an exit timestamp from the second zone; and determining that the first zone is associated with a first candidate advertisement from the set and that the second zone is associated with a second candidate advertisement from the set; selecting the first advertisement for the user responsive to discovering that the user performed a higher number of zone entry activities with respect to the first zone than the second zone; and sending the first candidate advertisement for display to the device of the user.

17. The system of claim 16, further comprising: detecting one or more activity of the user and one or more zone respectively corresponding to the one or more activity, wherein the one or more zone is located in a physical venue from the one or more physical venue, responsive to determining that the user has visited the physical venue; ascertaining that the user visited a first zone and a second zone from the one or more zone in the physical venue, wherein the first zone is distinctive from the second zone, wherein first location data corresponding to a first activity of the user includes an entry timestamp to the first zone, an exit timestamp from the first zone, and wherein second location data corresponding to a second activity of the user includes an entry timestamp to the second zone, an exit timestamp from the second zone, wherein the first zone is located in a first venue of the one or more physical venue, and wherein the second zone is located in a second zone of the one or more physical venue; determining that the first zone is associated with a first candidate advertisement from the set and that the second zone is associated with a second candidate advertisement from the set; selecting the first advertisement for the user, responsive to discovering that the user spent more time in the first zone than in the second zone by use of the first location data and the second location data; and sending the first candidate advertisement for display to the device of the user.

18. The system of claim 16, further comprising: detecting one or more activity of the user and one or more zone respectively corresponding to the one or more activity, wherein the one or more zone is located in a physical venue from the one or more physical venue, responsive to determining that the user has visited the physical venue; ascertaining that the user visited a first zone and a second zone from the one or more zone in the physical venue, wherein the first zone is distinctive from the second zone, wherein first location data corresponding to a first activity of the user includes an entry timestamp to the first zone, an exit timestamp from the first zone, and wherein second location data corresponding to a second activity of the user includes an entry timestamp to the second zone, an exit timestamp from the second zone; determining that the first zone is associated with a first candidate advertisement from the set and that the second zone is associated with a second candidate advertisement from the set; selecting the first advertisement for the user, responsive to discovering that the user spent time in the first zone more recently than in the second zone by use of the first location data and the second location data; and sending the first candidate advertisement for display to the device of the user.

19. The system of claim 16, further comprising: selecting a candidate advertisement from the set for the user according to a default category of an advertisement selection rule, wherein the default category selects the candidate advertisement without using location data generated from the one or more physical venue, responsive to determining that the user has not visited any of the one or more physical venue; and sending the candidate advertisement for display to the device of the user.

* * * * *